PLAMONDON & MAHER.
Grain Sieve.
No. 91,262.
Patented June 15, 1869.
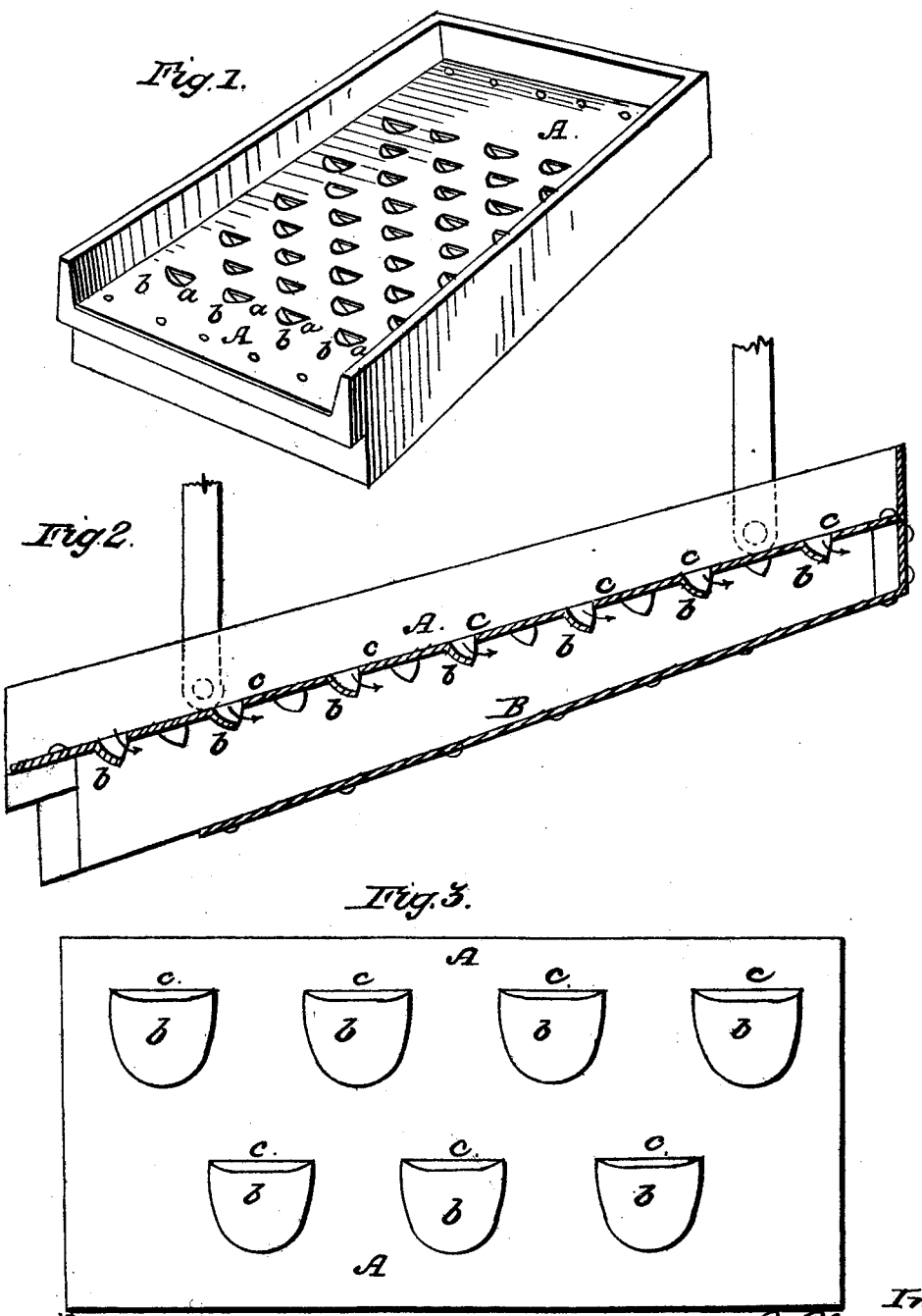

United States Patent Office.

PETER PLAMANDAN AND NATHAN A. MAHER, OF ATCHISON, KANSAS.

Letters Patent No. 91,262, dated June 15, 1869.

IMPROVEMENT IN GRAIN-SIEVE.

The Schedule referred to in these Letters Patent and making part of the same.

*To all whom it may concern:*

Be it known that we, PETER PLAMANDAN and NATHAN A. MAHER, of Atchison, in the county of Atchison, and State of Kansas, have invented a new and improved Grain-Sieve; and we do hereby declare that the following is a full, clear, and exact description thereof, reference being had to the accompanying drawings, making part of this specification, in which—

Figure 1 is a perspective view of our improved sieve arranged in a frame ready for use.

Figure 2 is a longitudinal section, taken vertically through the sieve and its frame.

Figure 3 is a portion of our improved sieve-plate, with enlarged passages.

Similar letters of reference indicate corresponding parts in the several figures.

This invention relates to an improvement on the construction of sieve-plates adapted for all kinds of machinery for separating grain from foreign substances mixed with it.

The nature of our invention consists in perforating a sheet-metal plate, in such manner that lips are formed upon its bottom side, of a concavo-convex form, and which will, when the sieve is arranged in an inclined plane for operation, afford channels for allowing the grain to pass freely through the sieve, but preventing sticks, oats, and other foreign substances mixed with the grain, from passing through the sieve, as will be hereinafter explained.

To enable others skilled in the art to understand our invention, we will describe one of our improved sieves and its operation.

We take a sheet-metal plate, of some ductile metal, and, with a tool having formed on its end a cutting-edge and the segment of a sphere, we punch the sheet, so as to form rows of passages arranged transversely across the plate, with the holes of one row opposite the spaces between the holes of the adjacent rows.

The punch strikes down concavo-convex lips, $b$, by first making the straight cuts $c$, and then drawing or stretching the metal on one side of these cuts, so as to leave passages, $a$, between the depressed semicircular edges of the lips and the straight edges $c$, through which passages the grain is allowed to pass.

It will be seen, by reference to fig. 3, that each lip $b$ is disconnected from the flat portion of the plate $A$ only along the straight edge over which the grain falls while in the act of escaping through the sieve. Consequently, the ends of sticks, straws, oats, and other foreign substances passing over the surface of the sieve, will not be liable to lodge at the depressions, nor escape through the passages $a$, unless they are very short, like the grain which it is desired to pass through the sieve; and, even should this be the case, the lateral agitation of the sieve will cause most of such short foreign substances, which fall upon the lips $b$, to roll back upon the upper surface of the plate or sieve.

To arrange the sieve for operation, it should be inclined, so that the material will freely slide over its surface in an opposite direction to the discharge of the grain through the passages $a$; and the lips leading to passages $a$ should be inclined, so that grains falling upon them will not lodge.

It will be seen that the lips $b$ incline in every direction toward their discharge-passages, that they incline laterally and longitudinally, with respect to the direction of the material passing over the surface of the sieve, and that substances which it is not desired should pass through the sieve, will not find lodgment in or about these lips.

Having described our invention,

We claim, as a new and improved article of manufacture—

A sieve-plate perforated in the manner described.

PETER PLAMANDAN.
NATHAN A. MAHER.

Witnesses:
WM. BOWMAN,
H. J. BOYER.